April 11, 1939.　　　E. T. GREGORIE　　　2,153,535

MOTOR VEHICLE CONSTRUCTION

Filed July 12, 1938　　　3 Sheets-Sheet 1

E. T. Gregorie
INVENTOR

BY Edwin C. McRae
E. L. Davis
ATTORNEYS.

WITNESS
E. Witke

April 11, 1939.     E. T. GREGORIE     2,153,535
MOTOR VEHICLE CONSTRUCTION
Filed July 12, 1938     3 Sheets-Sheet 2

WITNESS
E. Witzke

E. T. Gregorie
INVENTOR
BY Edwin C. McRae
E. L. Davis
ATTORNEYS.

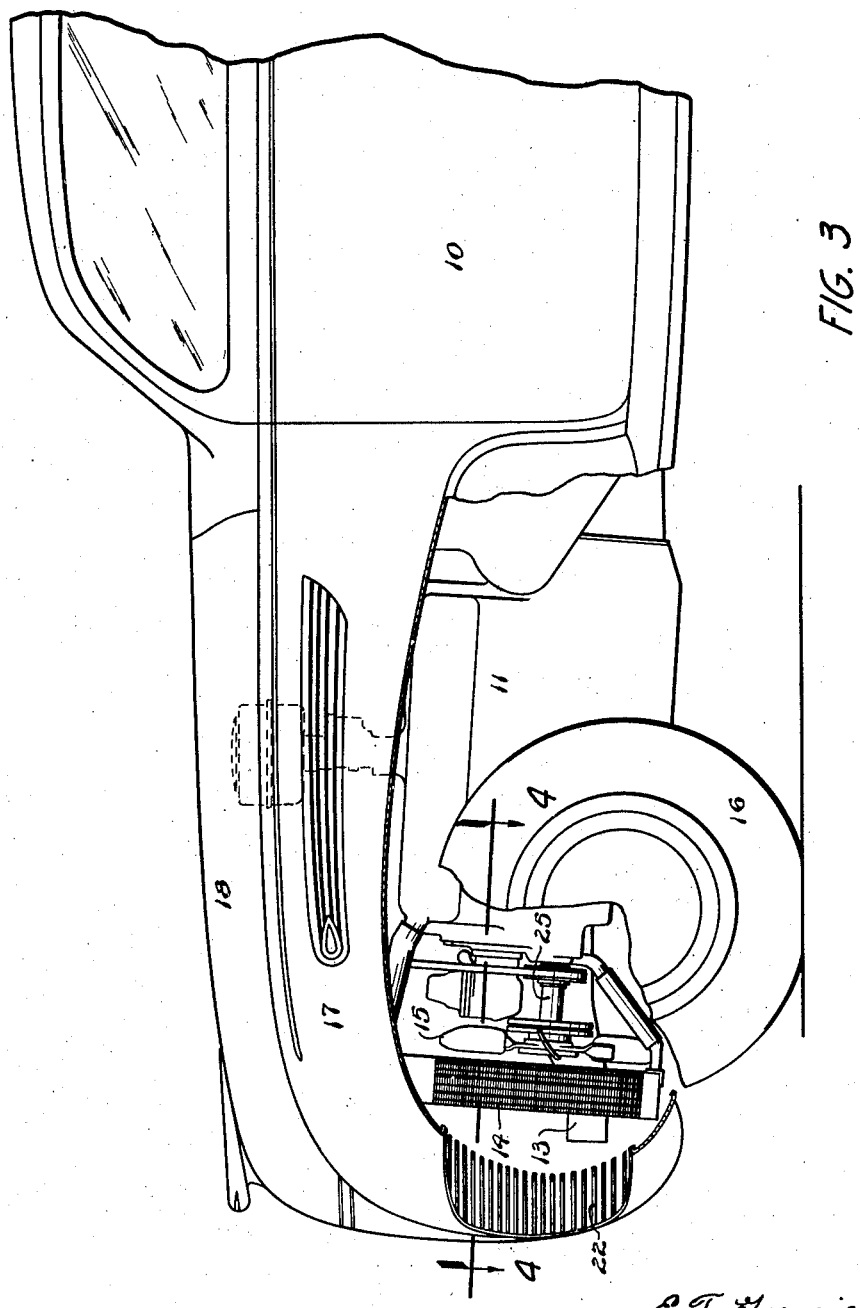

Patented Apr. 11, 1939

2,153,535

UNITED STATES PATENT OFFICE 2,153,535

MOTOR VEHICLE CONSTRUCTION

Eugene T. Gregorie, Grosse Ile, Mich., assignor to Ford Motor Company, Dearborn, Mich., a corporation of Delaware Application July 12, 1938, Serial No. 218,835

6 Claims. (Cl. 180—69)

The object of my invention is to provide a motor vehicle construction having increased aerodynamic efficiency and having means for taking in sufficient air for cooling the engine radiator without destroying the streamline characteristics of the car.

More specifically, the object of my invention is to provide an engine hood and fender construction in which the fenders extend completely across the front of the car, and are formed as airfoil sections. The leading edge of these airfoil sections have high pressure areas extending across their forward edges and low pressure areas extending along the top thereof. Louver openings are provided in the fenders, which openings extend laterally across the front of the vehicle and coincide with the high pressure area of the airfoil section. The engine radiator is positioned directly in back of these openings. Thus air which is directed against the high pressure zone of the airfoils is taken in through the louvers to cool the radiator, while the air which flows over the low pressure areas is not disturbed.

In the past it has been customary to provide a vertically extending radiator at the front of the car which extends substantially the full height of the engine hood. A radiator having sufficient capacity to cool the average engine must extend the full height of the hood. This prevents streamlining the front end of the hood. Radiator grilles of curved shape are customarily mounted in front of these radiators, but, of course, have no effect in streamlining the flat radiator core. An object of my invention is therefore to provide an engine hood which is shaped to effectively streamline the engine and front end of the car.

With these and other objects in view, my invention consists in the arrangement, construction and combination of the various elements of my improved construction, as described in my specification, claimed in my claims and illustrated in the accompanying drawings, in which:

Figure 3 is a sectional view, taken upon the line 3—3 of Figure 2.

Figure 1:
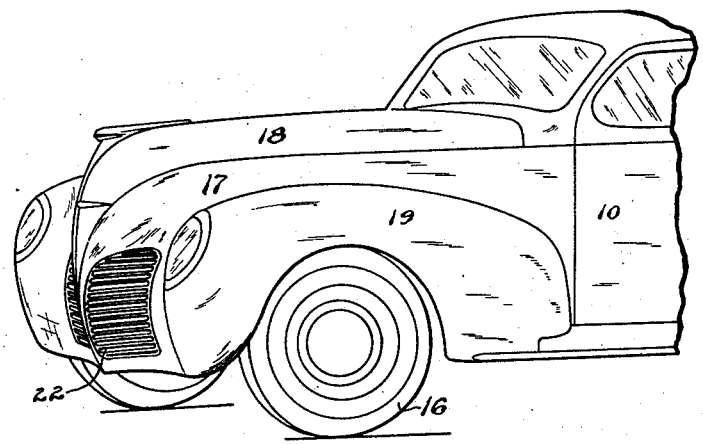
Figure 1 is a perspective view of the front portion of a motor vehicle incorporating my improved construction.

Referring to the accompanying drawings, I have used the reference numeral 10 to indicate the passenger portion of a motor vehicle body, which portion is of conventional modern streamlined design. A motor 11 is mounted in front of the passenger compartment 10 and is supported in part by a cross member 12 which extends laterally between the forward ends of body sill members 13. In this construction no chassis frame is provided, the body structure being designed with sufficient strength to resist the weight of the motor. A radiator 14 is mounted between the front ends of the body sills 13, which radiator is of rectangular shape but has a width nearly twice the height of the radiator. The bottom tank of the radiator is substantially aligned with the bottom of the engine. In order to draw air through the radiator in this relatively low position, an engine fan 15 is secured directly to the forward end of the engine crankshaft 25 so as to be in position just rearwardly of the radiator core 14. A pair of front wheels 16 are positioned substantially in alignment with the front end of the motor 11, which wheels support the body 10 through suitable springs in the conventional manner.

Figure 5:
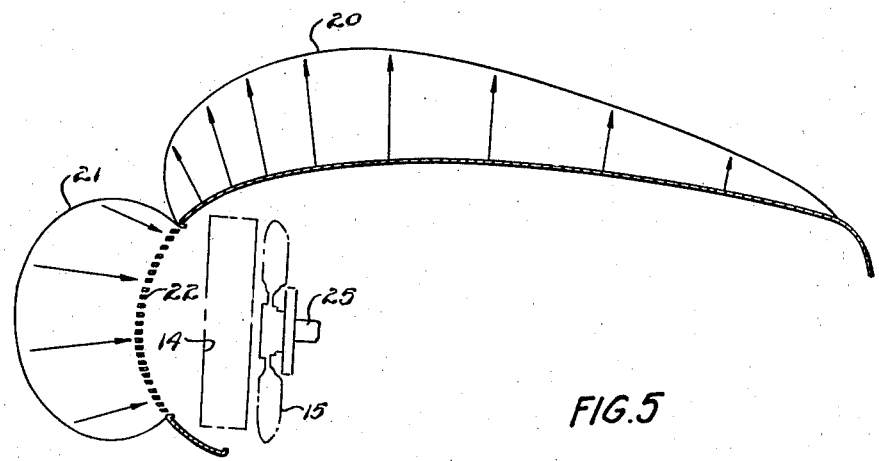
Figure 5 is a diagrammatic view, illustrating the high and low pressure areas of the airfoil section, shown in Figure 3.
Figure 2:
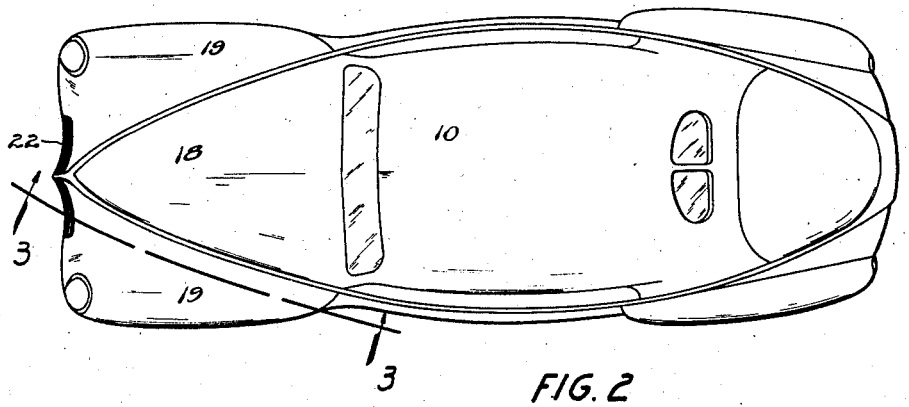
Figure 2 is a plan view of the motor vehicle, shown in Figure 1.
Figure 4:
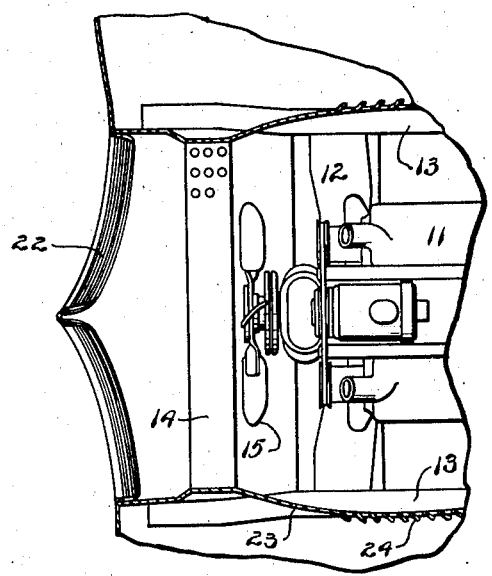
Figure 4 is a sectional view, taken upon the line 4—4 of Figure 3.

A streamlined engine hood is mounted over the engine 11, the hood comprising side panels 17 with a hinged lid 18. The side members are arranged in the form of a V and the lid 18 is pointed so as to form a streamlined enclosure over the upper portion of the motor. No louvers are provided in the hood so that oncoming air is deflected laterally with little turbulence. A pair of fenders 19 have their forward ends joined together at the center of the car and follow the side members to the rear of the hood. It will be noted from Figure 3 that a section taken on the line 3—3 of Figure 2 shows the fender formed with an airfoil shape. The upper portion of the fender is designed as a low pressure area, as shown by line 20 in Figure 5. The leading edges of the fenders are formed with spherical sections which extend laterally across the car, these sections being the high pressure area of the airfoil, as designated by line 21 in Figure 5.

From the foregoing, it will be seen that when the vehicle is being driven forwardly air will be deflected laterally by the side members 17 so that it will flow along the top of the fenders, substantially on a line through which section 3—3 is taken. Very little turbulence is thereby produced. The frontal area of the hood is negligible so that very little resistance results even at high air velocities.

The inner portion of the high pressure area of each fender, as shown by line 21, is provided with a grille 22, which grilles extend from the center of the car laterally substantially half the distances to the outside edges of the fenders. Inasmuch as the outer portion of each fender must form a mud guard for the wheel, the grille cannot extend beyond that required to form a compartment for movement of the wheel. The two grilles, however, extend substantially half the full distance across the front of the car.

A pair of deflecting plates 23 extend from each sill member 13 upwardly to the underside of the adjacent fender 19 and forwardly to its leading edge adjacent to the end of the grille member 22. The radiator 14 fits between the two plates 23 so that air entering through the grilles 22 will be directed through the radiator 14. The rear portion of each plate 23 is provided with louvers 24 through which air drawn through the radiator 14 is discharged by the fan 15.

It is well known that all airfoil sections have a high pressure area at their forward edges, which area is relatively large for thick airfoil sections. The air resistance is maximum at the high pressure area of the airfoil. For this reason it is impossible to eliminate entirely the fluid resistance of any type of motor vehicle construction. However, the grilles 22 are positioned in the high pressure area so that air which strikes the high pressure zone will be conducted through the radiator core. This construction has substantially the same air resistance that would result if the grilles were not provided, but only a fraction of the frontal area resistance ordinarily associated with motor vehicles.

In the ordinary vehicle the radiator extends vertically in front of the engine, and while the radiator grille may be shaped to an airfoil section, still this does not reduce the air resistance caused thereby. The total frontal resistance of the car is therefore that caused by the fenders plus that of the radiator. In my improved construction only the resistance of the fenders is encountered. The applicant, by taking in the air for cooling the engine through a longitudinal area which coincides with the high pressure area of the airfoil section of the fenders, is able to materially reduce the total air resistance.

Among the many advantages arising from the use of my improved construction, it may be well to mention that a very pleasing appearance is presented by this type of body and that this is accomplished without sacrificing the advantages of the conventional type of vehicle engine. In many streamlined cars that have been proposed and which maintain a low resistance factor, special horizontal motors are required or it is required to place the engine in the rear of the car. In the applicant's construction a conventional motor may be used which nearly fills the engine hood and still a very low air resistance factor results. It is only necessary to change the location of the fan and the shape of the radiator core to incorporate my invention in the conventional motor vehicle chassis.

Some changes may be made in the arrangement and combination of the various parts of my improved construction without departing from the spirit of my invention, and it is my intention to cover by my claims such changes as may reasonably be included within the scope thereof.

I claim as my invention:

1. In an automobile body construction, an engine hood extending forwardly from said body, said hood comprising a pair of vertically extending side members joined at their forward ends to form a V-shaped compartment with their rearward ends extending diagonally outwardly so as to be aligned with the sides of said body, a triangular shaped lid hinged to said body so as to swing down over the top edges of said side members to complete said hood, a pair of wheel fenders having their forward ends joined together with their rear portions extending from said side members to the outer edges respectively of the vehicle, a vertical section through each of said fenders taken parallel to the adjacent side members being of airfoil shape, and each of said fenders having a grille in its leading edge, said grilles extending from the center of the vehicle laterally substantially one-half the distance to the outer edge of the fender, and being aligned vertically with the high pressure zone of said airfoil section, said grilles together forming a horizontally extending air intake opening, an engine radiator disposed rearwardly of said grilles, and vertical shroud plates within each of said fenders which extend from the outer ends of each fender grille rearwardly along the respective sides of said radiator to the rear end of said hood.

2. In an automobile body construction, an engine hood extending forwardly from said body, said hood comprising a pair of vertically extending side members joined at their forward ends to form a V-shaped compartment with their rearward ends spread outwardly so as to be aligned with the respective sides of said body, a triangular shaped lid hinged to said body so as to swing down over the top edges of said side members to form said engine hood, a pair of wheel fenders having their forward ends joined together with their rear portions extending from said side members to the outer edges of the vehicle, a vertical section through each fender taken parallel to the adjacent side member being of airfoil shape, and each of said fenders having a relatively square grille in its leading edge which extends from the center of the vehicle laterally substantially one-half the distance to the outside of the fender and which is limited vertically to the high pressure zone of said airfoil section, said grilles together forming a rectangular shaped horizontal opening, and a horizontally extending engine radiator positioned rearwardly of said grilles in substantial alignment therewith.

3. In an automobile body construction, an engine hood extending forwardly from said body, said hood comprising a pair of vertical side members having their forward ends joined together with their rearward ends spread outwardly so as to be aligned with the sides of said body, a triangular shaped lid hinged over the top edges of said side members to complete said hood, a pair of wheel fenders having their forward ends joined together with their rear portions extending from said side members to the outer edges respectively of the vehicle, a vertical section through each of said fenders taken parallel to the adjacent side member being of airfoil shape, a relatively square grille formed in the leading edge of each fender which extends from the center of the vehicle laterally substantially one-half the distance to the outside edge of the fender, said grilles being limited vertically to the high pressure zone of said airfoil sections, and said grilles together forming a horizontally extending air intake opening, a rectangular shaped horizontally extending radiator core positioned just rearwardly of said grilles, an engine positioned within said hood just rearwardly of said radiator, the crankshaft of said engine having a fan fixed thereto between the engine and said radiator, and vertical shroud plates extending from the leading edge of each fender at the outer edge of its grille to the rear ends of said fenders, for the purpose described.

4. In an automobile body construction, a V-shaped engine hood extending forwardly from said body, said hood having vertical side members with a relatively flat top portion hinged thereon, a pair of wheel fenders extending from said side members to the outer edges of the vehicle, a vertical section through each fender taken parallel to the adjacent sides of said hood being of airfoil shape, an air intake grille formed in the leading edge of each of said fenders, each of said grilles extending from the center of the vehicle laterally substantially one-half the distance to the outside edge of the fender and being limited vertically to the high pressure zone of the airfoil section, said grilles together forming a horizontally extending air intake opening, a horizontally extending rectangular shaped radiator core positioned just rearwardly of the air intake, and vertical plates extending from the leading edges of said fenders rearwardly along the adjacent ends of the radiator to the rear ends of the fenders, the upper edges of said plates being secured to the inside edges of said fenders.

5. In an automobile body construction, an engine hood extending forwardly from said body, said hood comprising a pair of vertically extending side members having their forward ends converging to form a V-shaped compartment with the rear ends extending diagonally outwardly so as to be substantially aligned with the sides of said body, a pair of wheel fenders extending outwardly from the respective sides of said side members, a vertical section through each of said fenders taken parallel to the adjacent side members being of air-foil shape, and each of said fenders having a grille in its leading edge, said grilles extending from the center of the vehicle laterally substantially one-half the distance of the outer edges of the fenders, and being aligned vertically with the high-pressure zone of said airfoil section, said grilles together forming an horizontally extending air intake opening, an engine radiator disposed rearwardly of said grilles, and vertical shroud plates within each of said fenders which extend from the outer ends of each fender grille to said radiator so as to deflect the air from the full width of said grille into said radiator.

6. In an automobile body construction, an engine hood extending forwardly from said body, said hood being generally of V-shape with the divergent sides thereof substantially aligned with the sides of said body, a pair of wheel fenders extending outwardly from the sides of said hood to the respective outer edges of said vehicle, the front portions of said fenders and said hood being shaped to form an air-foil which extends laterally across the front of said vehicle, said air-foil having a grille in its leading edge which extends from the center of the vehicle laterally substantially one-half the distance to the outer edges of the fender, said grille being vertically aligned with the high-pressure zone of said air-foil, and said grille forming an horizontally extending air intake opening, an engine radiator positioned rearwardly of said grille, and vertical shroud plates extending from the leading edge of said air-foil at the respective ends of said grille rearwardly to said radiator so as to direct air over the full length of said grille into said radiator.

EUGENE T. GREGORIE.